US011544750B1

(12) United States Patent
Rothman

(10) Patent No.: US 11,544,750 B1
(45) Date of Patent: Jan. 3, 2023

(54) OVERLAYING CONTENT ITEMS WITH THIRD-PARTY REVIEWS

(71) Applicant: Google Inc., Mountain View, CA (US)

(72) Inventor: Aaron N. Rothman, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 1098 days.

(21) Appl. No.: 13/633,330

(22) Filed: Oct. 2, 2012

Related U.S. Application Data

(60) Provisional application No. 61/587,630, filed on Jan. 17, 2012.

(51) Int. Cl.
G06Q 30/00 (2012.01)
G06Q 30/02 (2012.01)
G06F 40/205 (2020.01)

(52) U.S. Cl.
CPC ....... *G06Q 30/0282* (2013.01); *G06F 40/205* (2020.01)

(58) Field of Classification Search
CPC . G06Q 30/00–30/0284; G06Q 30/0282; G06F 40/205
See application file for complete search history.

(56) References Cited

U.S. PATENT DOCUMENTS

| | | |
|---|---|---|
| 7,085,710 B1 | 8/2006 | Beckert et al. |
| 7,433,974 B2 | 10/2008 | Beckert et al. |
| 7,725,463 B2 | 5/2010 | Hurst-Hiller et al. |
| 8,001,290 B2 | 8/2011 | Beckert et al. |
| 8,028,093 B2 | 9/2011 | Karaoguz et al. |
| 8,065,026 B2 | 11/2011 | Beckert et al. |
| 9,154,534 B1 | 10/2015 | Gayles et al. |
| 9,396,490 B1 * | 7/2016 | Marx ................. G06Q 30/0282 |
| 2002/0152117 A1 | 10/2002 | Cristofalo et al. |

(Continued)

FOREIGN PATENT DOCUMENTS

| | | |
|---|---|---|
| EP | 1044119 B1 | 6/2005 |
| WO | WO 1999/035009 A | 7/1999 |
| WO | WO-2006/041754 | 4/2006 |

OTHER PUBLICATIONS

Izuddin Zainalabidin, Development of Display Ads Retrieval System to Match Publisher's Contents, p. 9 and 10 (Year: 2013).*

(Continued)

*Primary Examiner* — Abhishek Vyas
*Assistant Examiner* — Darnell A Pouncil
(74) *Attorney, Agent, or Firm* — Marshall, Gerstein & Borun LLP

(57) ABSTRACT

Methods, systems, and apparatus, including computer programs encoded on a computer-readable storage medium, and including a method for publishing content. The method comprises identifying a content item for publication. The method further comprises identifying one or more reviews associated with content included in the content item. The method further comprises evaluating a review including determining a rating for the content where determining the rating includes normalizing the rating to a first scale. The method further comprises extracting one or more relevant phrases from the review. The method further comprises publishing the content item along with a normalized rating and the one or more phrases.

30 Claims, 7 Drawing Sheets

(56) References Cited

U.S. PATENT DOCUMENTS

| | | | |
|---|---|---|---|
| 2004/0049503 | A1 | 3/2004 | Modha et al. |
| 2005/0209719 | A1 | 9/2005 | Beckert et al. |
| 2005/0209852 | A1 | 9/2005 | Beckert et al. |
| 2006/0004891 | A1 | 1/2006 | Hurst-Hiller et al. |
| 2006/0143158 | A1* | 6/2006 | Ruhl ................. G06F 17/30864 |
| 2007/0250193 | A1 | 10/2007 | Raines et al. |
| 2008/0216122 | A1 | 9/2008 | Pong et al. |
| 2008/0242280 | A1 | 10/2008 | Shapiro et al. |
| 2008/0288600 | A1 | 11/2008 | Clark |
| 2009/0063247 | A1* | 3/2009 | Burgess ................. G06Q 30/02 705/7.29 |
| 2009/0157491 | A1* | 6/2009 | Brougher et al. |
| 2009/0163186 | A1* | 6/2009 | Gupta .................... G06Q 30/02 455/414.2 |
| 2009/0228615 | A1 | 9/2009 | Beckert et al. |
| 2009/0267867 | A1 | 10/2009 | Gonia |
| 2010/0023395 | A1* | 1/2010 | Bugenhagen .......... G06Q 30/02 705/14.45 |
| 2010/0131563 | A1* | 5/2010 | Yin ....................... G06F 16/355 707/794 |
| 2010/0324993 | A1 | 12/2010 | Kacholia et al. |
| 2011/0153324 | A1 | 6/2011 | Ballinger et al. |
| 2011/0211114 | A1 | 9/2011 | Cooper |
| 2012/0047277 | A1 | 2/2012 | Keidar et al. |
| 2012/0054664 | A1 | 3/2012 | Dougall et al. |
| 2012/0060176 | A1 | 3/2012 | Chai et al. |
| 2012/0077586 | A1 | 3/2012 | Pishevar |
| 2012/0272147 | A1 | 10/2012 | Strober |
| 2012/0287022 | A1 | 11/2012 | Queen |
| 2013/0024364 | A1 | 1/2013 | Shrivastava et al. |
| 2013/0097239 | A1 | 4/2013 | Brown et al. |
| 2013/0124759 | A1 | 5/2013 | Strober |
| 2013/0246778 | A1 | 9/2013 | Nikara et al. |
| 2013/0311874 | A1 | 11/2013 | Schachar et al. |
| 2014/0020039 | A1 | 1/2014 | Wang et al. |
| 2014/0052872 | A1 | 2/2014 | Varoglu et al. |
| 2014/0067549 | A1 | 3/2014 | Park et al. |
| 2014/0067828 | A1 | 3/2014 | Archibong et al. |
| 2014/0085179 | A1 | 3/2014 | Krig et al. |
| 2014/0101710 | A1 | 4/2014 | Kim et al. |
| 2014/0108929 | A1 | 4/2014 | Garmark et al. |
| 2014/0172892 | A1 | 6/2014 | Schechter et al. |
| 2016/0162928 | A1 | 6/2016 | Ali |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0358301 | A1 | 12/2017 | Raitio et al. |

OTHER PUBLICATIONS

"Advice for YouTube: Find a Subscription Model to Keep Viewers Clicking." Wharton University of Pennsylvania [online], Jul. 17, 2013 [retrieved on Dec. 10, 2013]. Retrieved from the Internet. <URL: http://knowledge.wharton.upenn.edu/article/advice-for-youtube-find-a-subscription-model-to-keep-viewers-cliekcing/>, 7 pages.
"Walmart and Google to offer voice-enabled shopping", BBC News, Aug. 23, 2017 (10 pages).
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Apple, "What is Apple TV?" Apple [online], retrieved on Dec. 10, 2013. Retrieved from the Internet. <URL: http://www.apple.com/appletv/what-is/>, 5 pages.
Broussard, Mitchel, "Chatbot-Like Siri Patent Includes Intelligent Image, Video, and Audio Recognition within Messages", MacRumors, May 11, 2017 (7 pages).
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Forrest, Conner, "Essential Home wants to be bridge between Amazon's Alexis, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/on Aug. 22, 2017 (4 pages).
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Larson, Selena, "Google Home now recognizes your individual voice", CNN Money, San Francisco, California, Apr. 20, 2017 (3 pages).
Lee, Dave, "The five big announcements from Google I/O", BBC News, May 18, 2017 (9 pages).
Microsoft, "Advertising: Xbox 360." Microsoft [online], retrieved on Dec. 10, 2013. Retrieved from the Internet <URL: http://advertising.microsoft.com/en-us/xbox-360-advertising>, 2 pages.
Nieva, Richard, "Google Home and eBay can tell you how much that's worth", cnet, Mar. 8, 2017 (3 pages).
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Apple, "Today Google Home's Virtual Assistant can learn its Owner's voice for Security Reasons like Apple's Patent Pending Idea", Apr. 20, 2017, reprinted from http://www.patentlyapple.com/patently-apple/2017/04/today-google-homes-virtual-assistant-can-learn-its-owners-voice-for-security-reasons-like-apples-patent-pending-idea.html on Aug. 22, 2017 (4 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Roku, "What is Roku?" Roku [online], retrieved on Dec. 10, 2013. Retrieved from the Internet. <URL: http://www.roku.com/meet-roku>, 5 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).

(56) References Cited

OTHER PUBLICATIONS

Smith, Dave, "The Amazon Echo got 2 incredibly useful features thanks to a new update", Business Insider, Jun. 1, 2017 (5 pages).
U.S. Office Action on U.S. Appl. No. 14/102,348 dated Jan. 6, 2016.
U.S. Office Action on U.S. Appl. No. 14/102,348 dated Dec. 15, 2016.
U.S. Office Action on U.S. Appl. No. 14/102,348 dated Dec. 15, 2017.
U.S. Office Action on U.S. Appl. No. 14/102,348 dated Jul. 11, 2017.
U.S. Office Action on U.S. Appl. No. 14/102,348 dated Jul. 18, 2016.
Wikipedia, "Chromecast," Wikipedia [online], Oct. 28, 2013 [retrieved on Oct. 28, 2013], Retrieved from the Internet: <URL: http://en.wikipedia.org/wiki/Chromecast>, 6 pages.
Willens, Max, "For publishers, Amazon Alexa holds promise but not much money (yet)", Digiday, Jul. 6, 2017 (6 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "Aws DeepLens—Get Hands-on Experience with Deep Learning With Our New Video Camera", AWS News Blog, Nov. 29, 2017, 11 pages.
Buckland et al., "Amazon's Alexa Takes Open-Source Route to Beat Google Into Cars", Bloomberg, Feb. 27, 2018, 6 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
U.S. Office Action on U.S. Appl. No. 14/102,348 dated Aug. 1, 2018.
U.S. Final Office Action on U.S. Appl. No. 15/661,948 dated Sep. 11, 2019 (19 pages).
U.S. Non-Final Office Action on U.S. Appl. No. 14/102,348 dated May 29, 2019 (17 pages).
U.S. Non-Final Office Action on U.S. Appl. No. 15/661,948, dated Jan. 24, 2019, 16 pages.
U.S. Non-Final Office Action on U.S. Appl. No. 15/661,993 dated Sep. 6, 2019 (11 pages).
Advisory Action for U.S. Appl. No. 14/102,348 dated Jun. 22, 2020 (4 pages).
Roettgersaug, Janko, "The honest Chromecast review: Three weeks with Google's TV stick", Aug. 14, 2013 (8 pages).
Final Office Action for U.S. Appl. No. 14/102,348 dated Jan. 27, 2020 (18 pages).
Final Office Action for U.S. Appl. No. 15/661,993 dated Apr. 14, 2020 (12 pages).
Notice of Allowance for U.S. Appl. No. 15/661,948 dated Jan. 9, 2020 (8 pages).
Non-Final Office Action for U.S. Appl. No. 16/688,709 dated Dec. 24, 2020 (20 pages).
Notice of Allowance for U.S. Appl. No. 14/102,348 dated Aug. 20, 2020 (9 pages).
Notice of Allowance for U.S. Appl. No. 16/688,709 dated Apr. 16, 2021 (8 pages).
Non-Final Office Action for U.S. Appl. No. 16/661,993 dated Mar. 30, 2021 (12 pages).

* cited by examiner

OVERLAYING CONTENT ITEMS WITH THIRD-PARTY REVIEWS

CROSS-REFERENCE TO RELATED APPLICATION

This application claims the benefit of U.S. Provisional Application No. 61/587,630, filed Jan. 17, 2012.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for publishing content. The method includes identifying a content item for publication. The method further includes searching for and identifying one or more reviews associated with content included in the content item. The method further includes evaluating a review including determining a rating for the content where determining the rating includes normalizing the rating to a first scale. The method further includes extracting one or more relevant phrases from the review. The method further includes publishing the content item along with a normalized rating and the one or more phrases.

These and other implementations can each optionally include one or more of the following features. Publishing can include storing the content item. Publishing can include presenting the stored content item. Publishing can include determining, at a time the content item is served, current reviews, evaluating the current reviews, extracting the phrases from the current reviews, and publishing the content item with the extracted phrases. The content item can be an advertisement. The content can relate to a product or service. Identifying a content item for publication can include determining the content item for publication based on a received request from a user for a content item. The request can be a request for an advertisement. Searching for a review can include locating on-line reviews of the content. Searching for a review can include identifying reviewers that are acceptable to a source of the content item. The method can further include determining an aggregate normalized rating for the content based on the normalized ratings of the individual reviews. Evaluating each review can further include parsing content associated with each review to locate a rating of the content in the review, and normalizing the rating can include normalizing the located rating to the first scale. Evaluating each review can further include parsing content associated with each review to locate one or more rating keywords and developing the normalized rating based on the one or more rating keywords. Parsing can include counting occurrences of the rating keywords in the content and summing the total occurrences to develop the normalized rating. Parsing can include determining and counting occurrences of negative keywords and positive keywords and developing and further using the determined and counted occurrences to develop the normalized rating. Parsing can include weighting ones of the occurrences of rating keywords based on a location in the content. Weighting can be greater for occurrences in a first or last paragraph of the content. Weighting can be greater for occurrences in a title of the content. The rating keywords can signify positive, negative or neutral ratings of the content. Normalizing the rating to the first scale can include adjusting a rating associated with a review from a different scale to the first scale. The first scale can be one that includes a predetermined number of levels. The first scale can be one that includes a predetermined number of stars. Publishing the content item with the normalized ratings can include publishing the normalized ratings and one or more phrases as an overlay over the content item. Publishing the content item can include publishing the content item and the normalized rating adjacent to the content item. Publishing the normalized rating can include publishing rating attributes and values for one or more attributes that can be used to evaluate the content. A number and type of attributes evaluated can be based on the content. The number and type of attributes can be based on information associated with a user that requested the content item. Publishing the content items can include publishing a control for enabling a user to navigate to different reviews. Publishing the content item can include publishing aggregate rating information for the content with the content item. Publishing the content item can include publishing a normalized rating and one or more phrases from a single review along with the content item. Publishing the content item can include publishing a control to enable a user to navigate to a second different review, and publishing can include publishing a normalized rating and one or more comments from a second different review upon receipt of a selection of the control. Publishing the normalized rating can include publishing rating attributes and values for one or more attributes that can be used to evaluate the content, and the attributes can be based on the content.

In general, another innovative aspect of the subject matter described in this specification can be implemented in methods that include a method for publishing content. The method includes providing an interface to a content sponsor to enable the content sponsor to generate a creative associated with a distribution campaign. The method further includes presenting the content sponsor with an option to enable third-party reviews to be shown along with content of the content sponsor. The method further includes receiving a selection to enable third-party reviews. The method further includes, responsive to determining that a content item of the content sponsor is to be presented to a user, providing the third-party reviews along with the content item.

These and other implementations can each optionally include one or more of the following features. The method can further include enabling the content sponsor to designate certain reviewers as being unacceptable, and where upon such designation, providing the third-party reviews can include not providing any reviews from reviewers that are unacceptable to the content sponsor. The creative can be an advertisement creative and the distribution campaign is an advertisement campaign.

In general, another innovative aspect of the subject matter described in this specification can be implemented in systems that include a content management system for publishing content. The content management system includes a review identification engine that searches for and identifies one or more reviews associated with content included in a content item. The content management system further includes a review evaluation engine that evaluates each review including determining a rating for the content where determining a rating includes normalizing the rating to a first scale. The content management system further includes a phrase extraction engine that extracts one or more relevant phrases from each review. The content management system further includes a publication engine that publishes the content item along with a normalized rating and the one or more phrases. The content management system further includes a sponsor interface that: enables the a content sponsor to generate a creative associated with a distribution campaign; presents the content sponsor with an option to enable third-party reviews to be shown along with content of the content sponsor; and receives a selection to enable third-party reviews. The content management system further includes a request handler that, in response to a request for content and responsive to determining that a content item of the content sponsor is to be presented to a user, provides the normalized rating and the third-party reviews along with the content item.

In general, another innovative aspect of the subject matter described in this specification can be implemented in computer program products that include a computer program product tangibly embodied in a computer-readable storage device and comprising instructions. The instructions, when executed by a processor, cause the processor to: identify a content item for publication; search for and identify one or more reviews associated with content included in the content item; evaluate each review including determining a rating for the content where determining the rating includes normalizing the rating to a first scale; extract one or more relevant phrases from each review; and publish the content item along with a normalized rating and the one or more phrases.

In general, another innovative aspect of the subject matter described in this specification can be implemented in computer program products that include a computer program product tangibly embodied in a computer-readable storage device and comprising instructions. The instructions, when executed by a processor, cause the processor to: provide an interface to a content sponsor to enable the content sponsor to generate a creative associated with a distribution campaign; present the content sponsor with an option to enable third-party reviews to be shown along with content of the content sponsor; receive a selection to enable third-party reviews; and responsive to determining that a content item of the content sponsor is to be presented to a user, provide the third-party reviews along with the content item.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
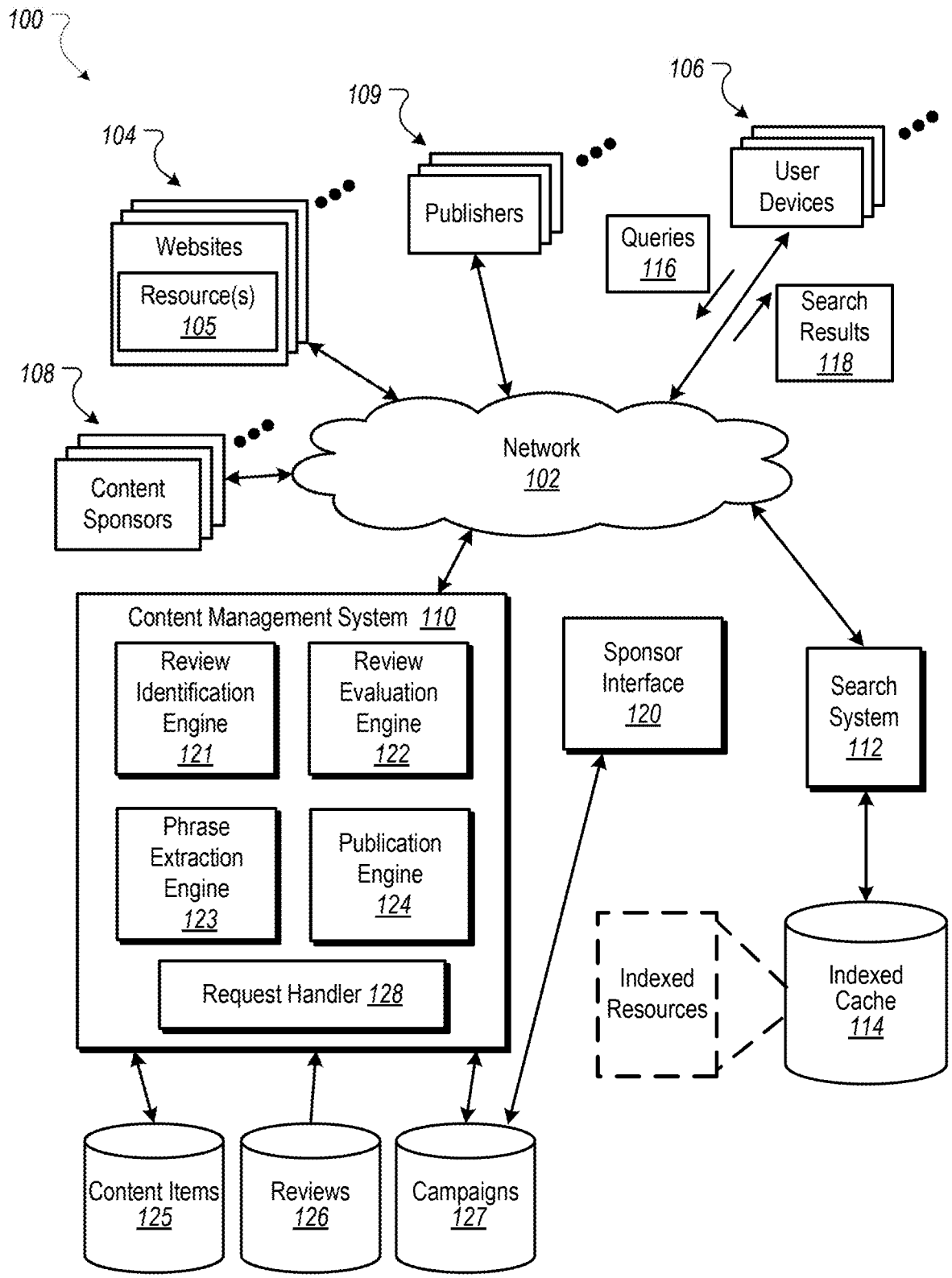
FIG. 1 is a block diagram of an example environment for delivering content.

This document describes methods, processes and systems for providing third-party review information on content items, e.g., as an overlay on the content item (e.g., an advertisement). The review information can be obtained, for example, from trusted web sites or other sources of independent review information from trusted reviewers of content associated with the content items. Example content can be a product (e.g., a particular manufacturer and style of basketball shoes) for which review information may exist on one or more web sites. When an advertisement appears for those particular basketball shoes, review information can be overlaid (or presented along with) on the advertisement that includes, for example, a normalized rating (e.g., N/5 stars) and other review information (e.g., comments, testimonials, etc.). The review information (e.g., for the overlay) can be prepared in advance of providing the advertisement, or the review information can be obtained in real time.

Normalized ratings can be obtained, for example, by parsing content from reviews having ratings of various formats. For example, one rating of basketball shoes may rate the shoes using a percentage (e.g., 95% satisfied), while another may grade the shoes with an A grade on an A-F scale. Other ratings from other reviews may use a five-star system or a numeric scale (e.g., 1-10). The normalized rating (e.g., to a five-star or other rating system) can be determined by mapping the non-standard reviews to standard (e.g., an appropriate number of stars (e.g., 95% satisfied=five out of five stars)).

Some reviews may have no explicit rating at all. In some implementations, a rating can be determined by parsing words and phrases in the review (e.g., " . . . best I've worn . . . ") to find keywords (e.g., "best") that can be used to determine a normalized rating (e.g., five stars).

Normalized ratings can also be provided for each of several attributes related to the content. For example, the overlay can include a display of individual normalized rating bars, one for each attribute related to basketball shoes (e.g., length fit, width fit, comfort, durability and price). Each bar can include a marker that designates, based on the marker's position on the bar, a relative rating that corresponds to that attribute. In some implementations, one side of a bar (e.g., the left side of a bar) can be labeled to indicate lower ratings or values, and the other side (e.g., the right side) can be labeled to indicate positive or higher values. For example, a marker's position toward the right side of the bar can indicate a positive rating or a greater value, while positions toward the left side of the bar can indicate lower ratings or values. Positions in the center of the bar can indicate an average or neutral rating for that attribute. The rating for any one bar can be a composite or average of multiple ratings for that attribute that have been obtained from several reviews.

The reviews can also be parsed to locate portions or snippets of the review that can be included with overlaid third-party review information. For example, by searching on specific keywords, reviewer comments such as "These are the best shoes I've ever worn" can be extracted. This comment and others can be displayed, for example, when the normalized rating (e.g., five stars out of five) is displayed with the advertisement. In some implementations, controls can exist by which the user can navigate through multiple comments, e.g., to see comments made by several independent reviewers.

Content sponsors, such as advertisers and marketers, can be provided with an option to include third-party review information on content items associated with campaigns. For example, a content sponsor interface can include features and/or controls by which an advertiser of basketball shoes can elect to include third-party review information on basketball shoe advertisements in an advertisement campaign. In some implementations, the advertiser can decide on the format and placement of the overlay in the advertisement creative.

In some implementations, content sponsors have the ability to designate which sources (e.g., trusted review web sites) are to be used for obtaining review information. For example, the content sponsor for basketball shoes may designate which sources to use and/or which sources not to use. The designation can occur, for example, on a campaign-by-campaign basis. In some implementations, designation of sources can be limited to selection from a pre-defined list of possibilities, e.g., to prevent content sponsors from selecting a review that they sponsored or for other reasons.

In some implementations, when setting up the creative or the campaign, the content sponsor can be presented with sample reviews. The samples can be presented, for example, as a preview overlay on the ad creative.

In some implementations, the content sponsor can provide different bids (or offers in a reservation system) for content items that use the third-party review information. For example, a content sponsor may bid higher for presentations of the content items with the overlays as opposed to presentations that do not have the overlays.

In some implementations, content sponsors can provide different bids for different types of engagements. For example, multiple different bids can represent the amount that the content sponsor will pay for different levels of engagement or different user actions. As an example, a higher bid can apply to impressions that lead to the user displaying and reading the reviews. In some implementations, content sponsors can be charged more and in different amounts depending on the types of engagements (e.g., cost per engagement).

In some implementations, content sponsors can select which type(s) of third-party review information to include when content items are presented. For example, the content sponsor can have options to include any or all of overall normalized ratings, attribute-level normalized ratings, user comments, or any other portions of the review content. In some implementations, users can opt out of receiving overlays of third-party review information when being presented with content items (e.g., advertisements).

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

In some implementations, the example environment 100 further includes a sponsor interface 120 that a content sponsor can use to create campaigns for content items. Using the sponsor interface 120, for example, the content sponsor can elect to enable the presentation, on content items in selected campaigns, of review content (e.g., overlays that include information from reviews).

The content management system 110 can include plural engines for processing reviews of content associated with a content item and publishing the content item with the review information. For example, a review identification engine 121 can search for and identify one or more reviews of content associated with a content item. A review evaluation engine 122 can evaluate each review and determine one or more ratings. For example, the ratings can include, for each review, ratings that are normalized to a common scale. The ratings can also include an overall rating based on the individual per-review ratings. A phrase extraction engine 123 can extract one or more relevant phrases from each review, e.g., snippets of user reviews of the product or service. A publication engine 124 can publish the content item along with the normalized ratings and the one or more phrases.

In some implementations, the environment 100 can include plural data stores. For example, a data store of content items 125 can include content items to be published, e.g., content items as they exist before they have third-party review information associated with them. The content items 125 can also include content items that have been published, e.g., stored and ready to be provided in response to a request for content. A data store of reviews 126 can contain ratings and testimonials provided by users and related to products and services reviewed by the users. In some implementations, the reviews 126 can logically include review information that is distributed, e.g., stored by various review entities (e.g., on the Internet) and accessible over the network 102. A data store of campaigns 127 can include campaigns that content sponsors create and update, including campaigns, for example, that are enabled to provide overlays of third-party review information on the content items when they are published.

In some implementations, the content management system 110 can include a request handler 128 that can receive a request for content from a user, identify one or more eligible content items, and provide a content item responsive to the request. For example, the eligible content items can include content items from campaigns for which the content sponsor has chosen to enable providing third-party review information with the content items.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers, televisions with one or more processors embedded therein or coupled thereto, set-top boxes, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is responsive to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors. In some implementations, offers can be based on different types of engagements. For example, content sponsors may make a higher offer for impressions that lead to the user reading and/or interacting with the reviews.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable/observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, the likelihood that a conversion will occur can be improved, such as by serving content that is more likely to be of interest to the user. For example, a content item (e.g., an ad for Brand-X basketball shoes) that is served with an overlay of third-party review information (e.g., user reviews and ratings for the Brand-X basketball shoes) may make it more likely that the user will engage with the content item and potentially lead to a conversion.

For situations in which the systems discussed here collect personal information about users, the users may be provided with an opportunity to opt in/out of programs or features that may collect personal information (e.g., information about a user's social network, social actions or activities, a user's preferences or a user's current location). In addition, certain data may be anonymized in one or more ways before it is stored or used, so that personally identifiable information is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Figure 2:
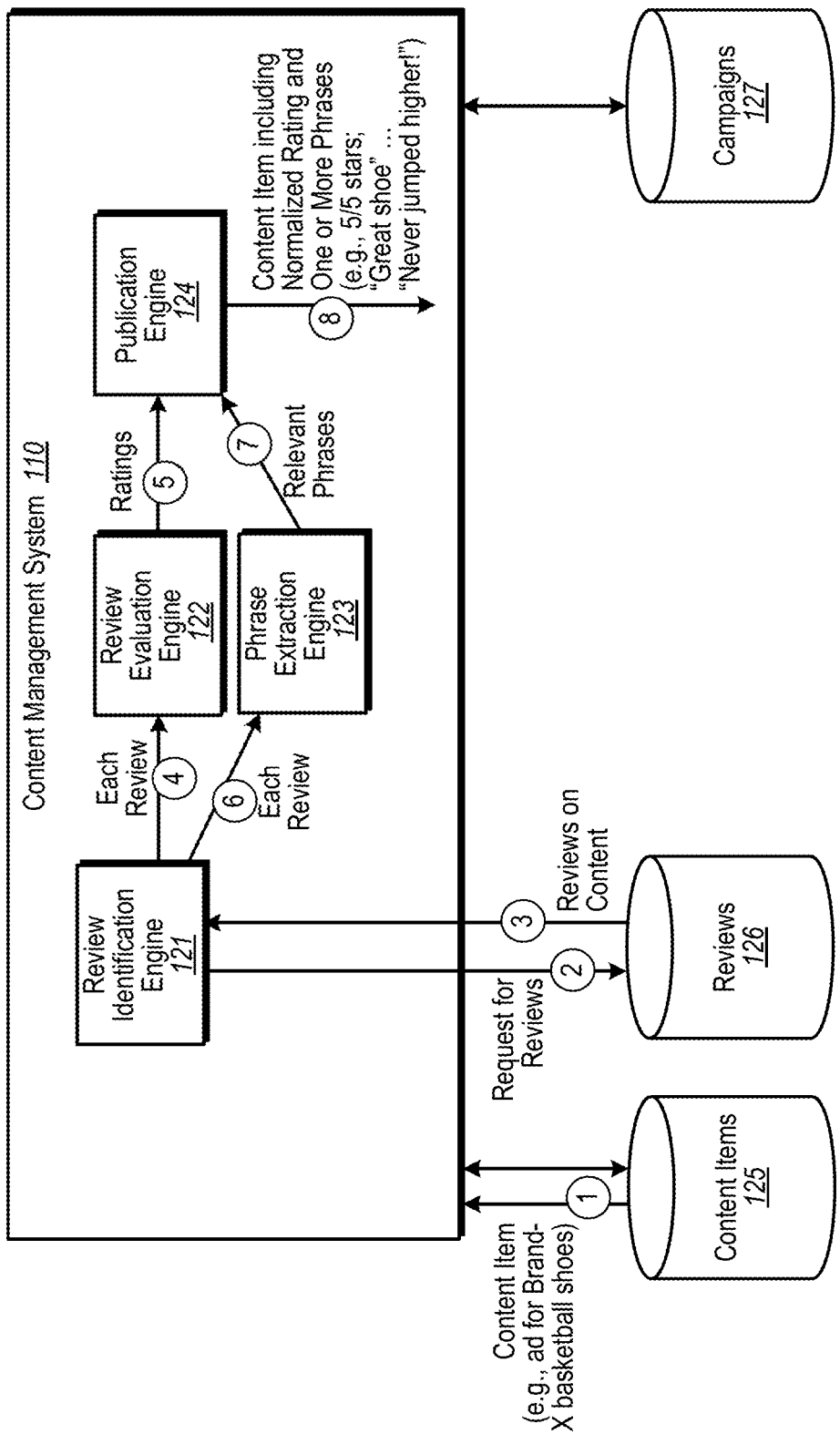
FIG. 2 shows an example system for publishing content items with normalized ratings from third-party reviews.

FIG. 2 shows an example system 200 for publishing content items with normalized ratings from third-party reviews. In some implementations, the system 200 can be used to publish content items used in the environment 100. For example, the content management system 110 can use content items 125 and information from third-party reviews 126 for to publish content items with overlays that include normalized ratings. An example sequence of events follows in which publishing the content items is achieved in eight stages.

In some implementations, the content management system 110 can identify a content item for publication (stage 1). The identification can occur, for example, when a new content item (e.g., an advertisement for Brand-X basketball shoes) is created by a content sponsor, e.g., in an advertising campaign using a sponsor interface of an advertising management system. In some implementations, identification can include determining the content item for publication based on a received request from a user for a content item. For example, the content item can be identified in response to a content item request (e.g., an advertisement request) that is received from an application (e.g., browser, web page, etc.) on a user's computing device or by a website or other resource host.

Using an identification of the content item received, the review identification engine 121 can search for and identify one or more reviews for the content (e.g., Brand-X basketball shoes) associated with the content item (e.g., the advertisement for Brand-X basketball shoes).

In some implementations, the review identification engine 121 can locate on-line reviews of the content, e.g., by making a request to one or more online review agencies to obtain reviews for the corresponding content (stage 2). The request can occur, for example, using the network 102, and can be fulfilled by one or more public or private online review entities, such as websites and/or repositories that handle third-party reviews. For example, if the content item is an advertisement for basketball shoes (e.g., Brand-X), then the request can be for all existing reviews of Brand-X basketball shoes. In some implementations, locating reviews of the content can be predicated by identifying or selecting reviewers that are acceptable to a source of the content item. For example, content providers 108 can be allowed to specify which reviewers are acceptable for providing reviews of the products or services for which the content items are related.

In some implementations, the online review entities queried by the review identification engine 121 using the request can depend on the product or service. For example, the online review entities that are queried for basketball shoes may be, either partially or completely, different than the online review entities that are queried for other products or services (e.g., carpet-steaming services).

When the reviews are provided by the reviewing agencies (e.g., reviews for Brand-X basketball shoes), the review identification engine 121 can receive the reviews (stage 3). Any number of reviews can exist. For example, there may be hundreds or more reviews for a product or service, or there may be no reviews (e.g., for a new product, or one that is yet un-reviewed).

In some implementations, the review evaluation engine 122 can evaluate each review (stage 4). For example, for each review, the review evaluation engine 122 can evaluate any textual, numeric or other formats of the review. The evaluation can include, for example, determining a rating for the content. Determining the rating can include, for example, normalizing the rating to a first scale (stage 5). For example, each review for a product or service can use a different rating scale, such as a numeric scale, a number of stars, thumbs up or down, textual descriptions, and/or some other rating system. It can be an objective of the review evaluation engine 122, for example, to process reviews of any type and/or format in order to arrive at a standard format. For example, ratings can be normalized to a first scale (e.g., a five-star system) from plural second scales.

In some implementations, evaluating each review can include parsing content associated with the review to locate a rating for the content in the review before normalizing the located rating to the first scale. For example, the review evaluation engine 122 can parse each review to identify, within the review, one or more portions of content that can be used to determine a normalized rating.

In some implementations, the review evaluation engine 122 can parse the content associated with each review to locate one or more rating keywords, and develop the normalized rating based on the one or more rating keywords. For example, the rating keywords can include positive, negative or neutral words or phrases, e.g., that include bad, worst, average, good, better, best, impressive, amazing, etc. As an example, if the keyword "was only average" (or a similar keyword) is located while parsing content associated with the review, the review evaluation engine 122 can assign a medium normalized rating, e.g., three out of five stars. In another example, if the keyword "was the best I've worn" (or a similar keyword) is located while parsing content associated with the review, the review evaluation engine 122 can assign a higher or highest normalized rating, e.g., four or five stars.

In some implementations, the rating that is determined can depend on the number of keywords that indicate any one rating (e.g., bad, average, good, etc.). For example, parsing the content can include counting occurrences of the rating keywords in the content and summing the total occurrences to develop the normalized rating. As an example, if 18 out of 22 keywords indicate a highest rating (e.g., five stars), but four keywords indicate low to average ratings, then the review evaluation engine 122 can determine a normalized rating of four stars (e.g., as an overall average based on the counts of keywords). In some implementations, using the counts in the same example, the review evaluation engine 122 can determine a normalized rating of five stars (e.g., based on the majority of 18 highest-rating keywords out of 22). In this example, the 18 keywords can be different (or the same or a mixture) as long as they indicate the highest rating (e.g., five stars).

In some implementations, parsing each review can include determining and counting occurrences of negative keywords and positive keywords and using the determined and counted occurrences to further develop the normalized rating. In some implementations, the review evaluation engine 122 can remove neutral keywords from consideration and focus on negative keywords (e.g., worst, bad, etc.) and positive keywords (e.g., good, excellent, best, etc.) in determining a normalized rating. In some implementations, if the positive keywords out-number the negative keywords, for example, then the review evaluation engine 122 can assign a higher normalized rating (e.g., four or five stars).

In some implementations, parsing each review can include weighting ones of the occurrences of rating keywords based on, for example, the keywords' location(s) in the content. For example, positive and/or negative keywords can receive a greater weighting if their occurrences are in a first or last paragraph of the content, in a title of the content, or in some other prominent location that indicates a relative importance of the keyword.

In some implementations, reviews can include metadata, such as categories of fields in which the text exists. For example, some reviews can be provided using something other than a free-text input, such as by using a category or annotation that gives some helpful direction to the reviewer. As an example, the review can include different parts or categories, such as "overall", "pros" and "cons". The rating scale (e.g., a star rating or 1-10 rating) can be similarly designated. Further, reviews without metadata can have metadata interpreted from the context of the review, such as the term "best" used with the term "price" rather than with the term "quality."

In some implementations, the review evaluation engine 122 can adjust for scales used in reviews that are different than any normalized rating that the review evaluation engine 122 practices. For example, when normalizing a rating to the first scale (e.g., a five-star system), the review evaluation engine 122 can adjusting a rating associated with a review from a different scale (e.g., 1-10) to the first scale (e.g., the five-star system). In some implementations, the first scale used by the review evaluation engine 122 can include a predetermined number of levels, e.g., five stars, an N-level numeric system, or any other scale that has a predetermined number of levels.

Each of the individual ratings determined for a content item can be displayed separately, e.g., when the content item is displayed to the user. For example, the overlay that includes review information can include the presentation of one or more controls for sequencing through each of the individual reviews, or through selected ones of the reviews, such as the N most-trusted reviews. In some implementations, an aggregate normalized rating can be determined for the content based on the normalized ratings of the individual reviews. For example, the review evaluation engine 122 can compute an overall rating for the content associated with the content item.

At the same time that the review evaluation engine 122 determines normalized ratings, or at a different time, the phrase extraction engine 123 can extract one or more relevant phrases from each review. In some implementations, phrase extraction performed by the phrase extraction engine 123 can occur while the review evaluation engine 122 is parsing the content of a review in order, for example, to parse the content a single time.

In some implementations, extracting one or more relevant phrases can include extracting phrases that include keywords, e.g., positive keywords that a content sponsor would prefer to see in an overlay on an ad. For example, for reviews related to Brand-X basketball shoes, the phrase extraction engine 123 can extract phrases that contain positive keywords (e.g., great, best, excellent, etc.) in combination with words related to shoes (e.g., fit, comfort, durability, etc.). The positive keywords can exist, for example, in combination with the metadata terms described above.

Once all reviews for the content associated with the content item are processed, including determining normalized ratings and extracting phrases, the content item can be published (stage 8). For example, the publication engine 124 can publish the content item along with a normalized rating and the one or more phrases.

In some implementations, publishing the content item can include storing the content item. For example, the publication engine 124 can store the content item together with its third-party review information (e.g., normalized ratings and extracting phrases) in the content items 125.

In some implementations, publishing the content item can include presenting the stored content item. For example, in response to a request for content, the publication engine 124 or the request handler 128 can access and provide the content item (e.g., overlaid with the third-party review information) to the requester.

In some implementations, publishing the content item can include determining, at a time the content item is served, current reviews, evaluating the current reviews, extracting the phrases from the current reviews, and publishing the content item with the extracted review information. For example, part or all of the review information needed to create an annotated content item can be determined in real time, e.g., in response to a request for content from a user. For example, the request for content can be to provide an advertisement in an advertisement slot on a user screen. Specifically, in response to the request for content, the review identification engine 121 can identify the reviews for the content associated with the content item responsive to the request. Then, the review evaluation engine 122 can evaluate the reviews to generate normalized ratings, and the phrase extraction engine 123 can extract phrases associated with the reviews. The information can then be used to overlay the content item with third-party review information, and the overlaid content item can be provided in response to the request.

In some implementations, publishing the content item with the normalized ratings includes publishing the normalized ratings and one or more phrases as an overlay on the content item. For example, the overlay can include snippets of comments provided by users who have submitted comments regarding the content (e.g., Brand-X basketball shoes) as part of the review.

In some implementations, the types of users who can provide comments include trusted reviewers and other reviewers. Trusted reviewers, for example, can include anyone or any organizations that have been independently recognized as being capable of providing objective and relevant reviews of products or services. In some implementations, other reviewers can include socially-connected users, e.g., the user's friends in a social network. In some implementations, other types of users can provide comments, if a user's friends have commented on a product or service, then the comments can be shown to the user (and other socially-connected users) but not to the population at large.

In some implementations, publishing the content item can include publishing the content item and the normalized rating adjacent to the content item. For example, the ratings, as well as the entire overlay, can be displayed next to, below or in close proximity to images and/or text that make up the content item.

In some implementations, publishing the normalized rating includes publishing rating attributes and values for one or more attributes that can be used to evaluate the content. For example, when publishing ratings associated with basketball shoes, the normalized rating can include ratings (e.g., as bar charts, sliders, numbers, scores, etc.) for each of different aspects related to basketball shoes. The aspects for basketball shoes can include, for example, comfort, price, value, fit (e.g., size correctness), etc. The terms comfort, price, value and fit, for example, are also examples of terms that can be associated with metadata, as described above.

In some implementations, the number and type of attributes evaluated can be based on the content. For example, for content related to basketball shoes, there can be at least five attributes evaluated including, for example, shoe length fit, shoe width fit, comfort, durability and price. Other products and services may have other numbers and types of attributes. For example, carpet cleaning services can have three or more evaluated attributes, e.g., price, promptness and cleanliness, and a specialized medical product can have at least two evaluated attributes, e.g., effectiveness and availability.

In some implementations, the number and type of attributes evaluated can be based on information associated with a user that requested the content item. For example, if user Bill is known to be a professional basketball player (e.g., through information voluntarily supplied in a personal profile or information gathered in other ways), then the attributes evaluated can exclude attributes that are considered to be of no concern to Bill (e.g., price). Other attributes may be included that may otherwise be excluded by default for the average user, such as the color attribute if Bill is known to be interested in product colors. In some implementations, demographics can be used, e.g., to include price as an evaluated attribute for a user who is married with four kids and who has an annual income below $40K.

In some implementations, publishing the content item can include publishing a control for enabling a user to navigate to different reviews. As an example, several reviews for the same product or service may be published with a content item. In some implementations, the control can include multiple sub-controls, e.g., to navigate to the next review, the previous review, the first review, etc. Other controls can exist to present the reviews in different ways, e.g., to sort the reviews by date, number of stars, and so on.

In some implementations, publishing the content item can include publishing aggregate rating information for the content with the content item. For example, in addition to the individual reviews that are published with a content item, an overall review can be included.

In some implementations, publishing the content item can include publishing a normalized rating and one or more phrases extracted from a single review along with the content item. As an example, the aggregate rating information can include a normalized rating that is an average of the ratings of the individual reviews.

In some implementations, publishing the content item can include publishing a control to enable a user to navigate to a second different review. For example, if the user selects the control, then a normalized rating and one or more comments from the second different review are displayed.

In some implementations, publishing the normalized rating can include publishing rating attributes and values for one or more attributes that can be used to evaluate the content. For example, the normalized rating for basketball shoes can include attributes related to fit, comfort and durability. In this example, the user who reviews the rating can use information in the rating to assess aspects of the basketball shoes that are presented in the corresponding content item (e.g., an advertisement for basketball shoes).

Figure 3:
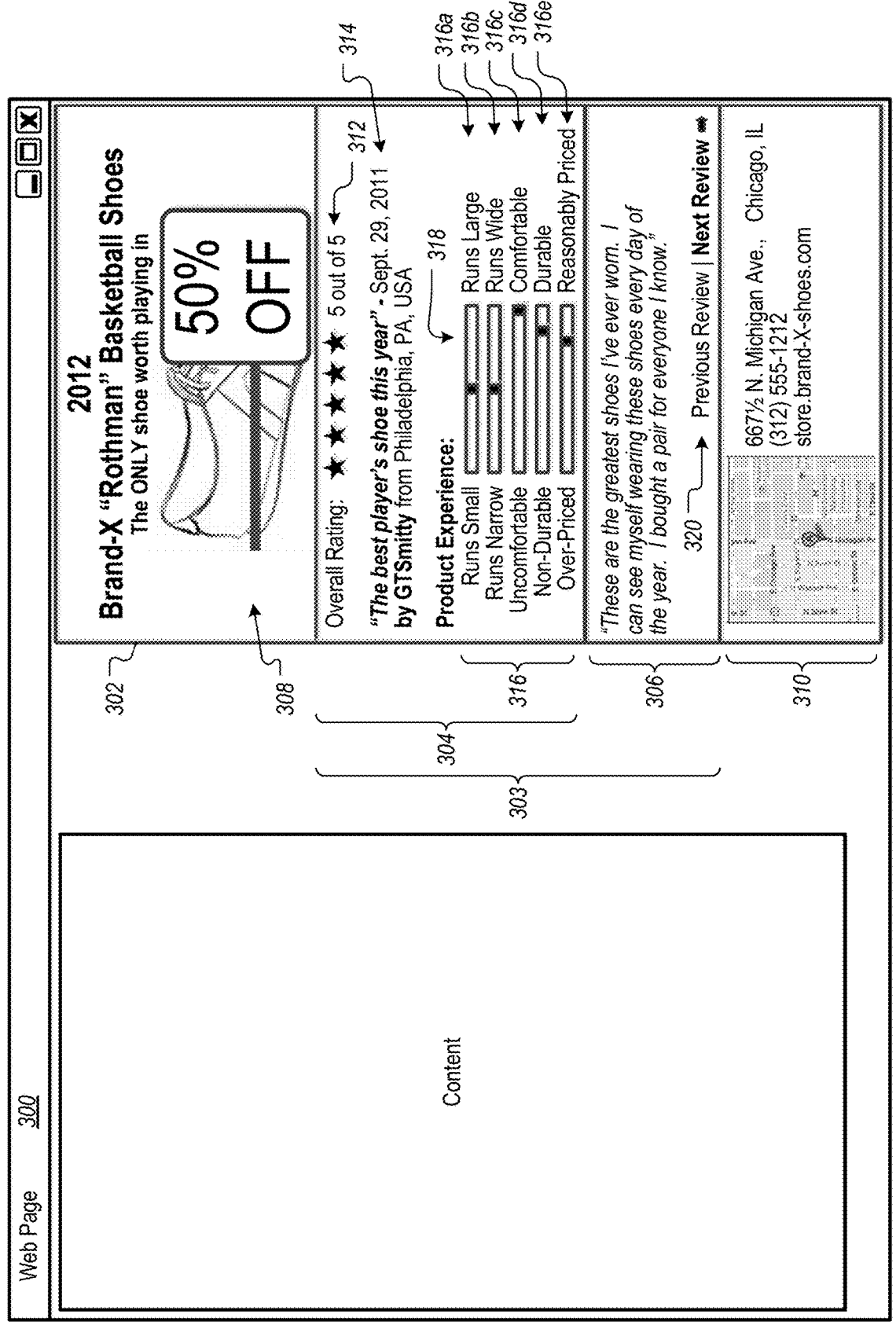
FIG. 3 is a screen shot of an example advertisement overlaid with information from third-party reviews.

FIG. 3 is a screen shot of an example user interface 300 that includes a content item 302 overlaid with third-party review information 303. For example, the content item 302 can be related to any product or service, e.g., an advertisement for Brand-X basketball shoes. The third-party review information 303 can be based, for example, on user reviews that are specific to that particular brand and/or style of shoes. The content item 302 can be displayed, for example, in a content item slot on the user interface 300 (e.g., a web page displayed in the user's browser).

In some implementations, the third-party review information 303 can include a normalized rating area 304, a testimonial area 306, as well as other areas not shown in FIG. 3. In some implementations, the content item 302 can also include content 308 and map information 310. The content 308, for example, can include a product/service name or title, one or more images related to the product or service, promotional information, videos, links, etc. The map information 310, for example, can identify one or more entities that provide the product or service, such as a shoe store that sells Brand-X basketball shoes. In some implementations, the third-party review information 303 can be created by the system 200 described above with reference to FIG. 2.

The normalized rating area 304 in this example includes an overall rating 312. For example, the overall rating 312 can indicate that the Brand-X basketball shoes have a normalized rating of five stars based on a rating scale of up to five stars. In some implementations, the normalized rating can be an average of individual ratings of reviews that are associated with individual testimonials in the testimonial area 306. For example, there may be ten individual user reviews of the Brand-X basketball shoes, and nine of the ten may rate the shoes with five out of five stars in a rating, resulting in an average of five stars. In some implementations, the scale used for the overall rating 312 can be normalized and based on ratings having different scales, such as percentages, one-to-ten scores, or some other rating system. In some implementations, the overall rating 312 can be based at least in part on parsing content in reviews, including parsing the content to locate and identify one or more rating keywords that can be used to determine ratings.

The normalized rating area 304 in this example also includes a product review 314 (e.g., "The best player's shoe this year"). In some implementations, the product review 314 can be one selected from individual reviews displayable within the testimonial area 306, or the product review 314 can be generated from other sources. In some implementations, the product review 314 can include the date and source of the review, e.g., to indicate that the review was made on "Sep. 29, 2011" by "GTSmitty from Philadelphia, Pa., USA." In some implementations, the product review 314 can be a review chosen by the content sponsor 108 (e.g., from multiple reviews) when creating the creative and upon indicating that third-party reviews are to be overlaid on content items in the campaign.

The normalized rating area 304 in this example further includes normalized attribute ratings 316 that provide ratings for each of the attributes associated with basketball shoes. In some implementations, the normalized attribute ratings 316 can include a normalized bar display 318, with a bar for each one of the attributes (e.g., length fit, width fit, comfort, durability and price) associated with basketball shoes. In some implementations, each bar in the normalized bar display 318 can include a marker (e.g., a square positioned along the length of the bar), and the marker's position can indicate a relative rating.

In some implementations, the position of the marker can indicate a negative or positive rating for that attribute. For example, negative or lower ratings can be indicated by marker positions nearer the left ends of the bars, and positive or higher ratings can be indicated by marker positions nearer the right ends of the bars. For comfort rating 316c, for example, the marker is positioned at the far right end of the bar, indicating that the comfort of the basketball shoes is rated as high as is possible. In another example, the marker for the durability rating 316d is positioned near the far right end of the bar, indicating that the durability of the basketball shoes is rated much higher than average. In another example, the marker for the price rating 316e is positioned to the right of the bar's center, indicating that the shoes' price is rated more reasonable than average.

In some implementations, the position of the marker can indicate a relative closeness to either of opposing attributes. For shoe-length fit rating 316a, for example, the marker is positioned at the center of the bar, indicating that, on average, users have reported that the shoes do not run significantly smaller or significantly larger in length than expected. In another example, the marker for the shoe-width fit rating 316b is positioned at the bar's center, indicating that users have reported that the shoes' width runs neither narrow nor wide.

The testimonial area 306 can be used to display testimonials extracted from reviews associated with the content corresponding to the content item 302. In the example shown in FIG. 3, each testimonial can be a comment received from a different user regarding Brand-X basketball shoes. In some implementations, when the content item 302 is presented to a user, controls 320 can be provided that the user can use to cycle through the testimonials. For example, the controls 320 can include individual controls for navigating to the previous review or the next review. In some implementations, the testimonials can automatically cycle through sequentially, e.g., on a delay. For example, the first testimonial can be displayed, followed five seconds later by the next testimonial, and so on.

In some implementations, when insufficient reviews exist for the product or service, the third-party review information 303 can be omitted. Alternatively, a notification can inform the user that no reviews exist.

Figure 4:
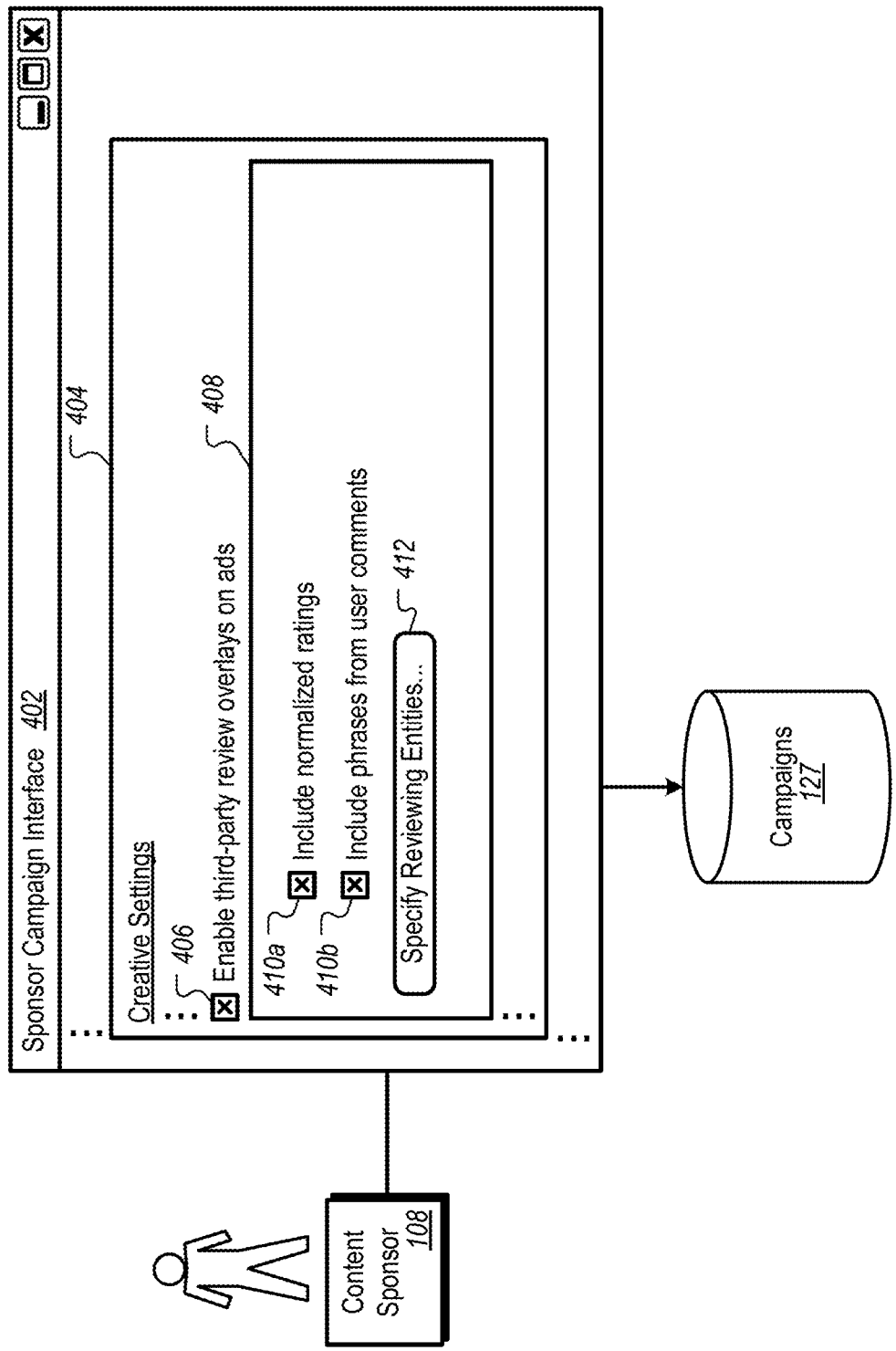
FIG. 4 is a screen shot of an example sponsor interface for specifying inclusion of third-party review information with an advertisement.

FIG. 4 is a screen shot of an example sponsor campaign interface 402 for specifying inclusion of third-party review information 402 with an advertisement. For example, the content sponsor 108 can use the sponsor campaign interface 402 to create one or more campaigns 127 (e.g., advertising campaigns) that are enabled to provide/overlay third-party review information with content items. In some implementations, the sponsor campaign interface 402 can be provided by the sponsor interface 120 described with reference to FIG. 1. In some implementations, the content sponsor 108 can use other interfaces to specify that third-party review information is to be included with the content items.

The sponsor campaign interface 402 can include a creative settings area 404 in which the content sponsor 108 can specify the format and content of creatives in a campaign. The creative settings area 404 can be, for example, one of several setting specification areas within the sponsor campaign interface 402. In some implementations, the creative settings area 404 can include one or more controls for enabling third-party review information to be included with content items in the campaign. For example, the content sponsor 108 can select an enable control 406, e.g., by checking an "Enable third-party review overlays on ads" checkbox, as an indication to include third-party review information with content items in the campaign.

In some implementations, selection of the enable control 406 can result in the presentation of an options area 408, e.g., that otherwise does not appear, or is grayed out, if the checkbox is unchecked. In some implementations, the options area 408 can include individual controls, e.g., checkboxes 410a and 410b, for specifying settings when third-party reviews are enabled. Other types of controls and checkboxes can exist that are not shown in FIG. 4.

In some implementations, the content sponsor 108, for example, can check the checkbox 410a to include normalized ratings on third-party review overlays. For example, referring to FIG. 3, having the checkbox 410a checked can result in displaying the overlay of third-party review information 303. In some implementations, if the content sponsor 108 checks the checkbox 410b, then the presentation of content items in the campaign includes phases extracted from user comments on content corresponding to the content items.

In some implementations, selection of a review entities control 412 can result in displaying an interface by which the content sponsor 108 can select and/or exclude specific reviewing entities. For example, the content sponsor 108 who is an advertiser of basketball shoes may select several trusted review web sites that are more dependable at giving accurate reviews/ratings on basketball shoes, and exclude web sites that do not give favorable or accurate reviews/ratings.

In some implementations, bid controls (not shown in FIG. 4) can allow the content sponsor to provide different bid amounts (or offers in a reservation system) for presentations of the content item that present the third-party review information. For example, the content sponsor may provide a different (e.g., higher) bid amount for impressions of a content item that include the overlay of third-party review information. In some implementations, the decision of whether or not to include the overlay can occur in real time, e.g., depending on the size of the content item slot. For example, if the content item slot is large enough for the basketball shoes advertisement including the overlay, then the higher bid amount can be used in an auction that includes the basketball shoes advertisement and other content items.

Figure 5A:
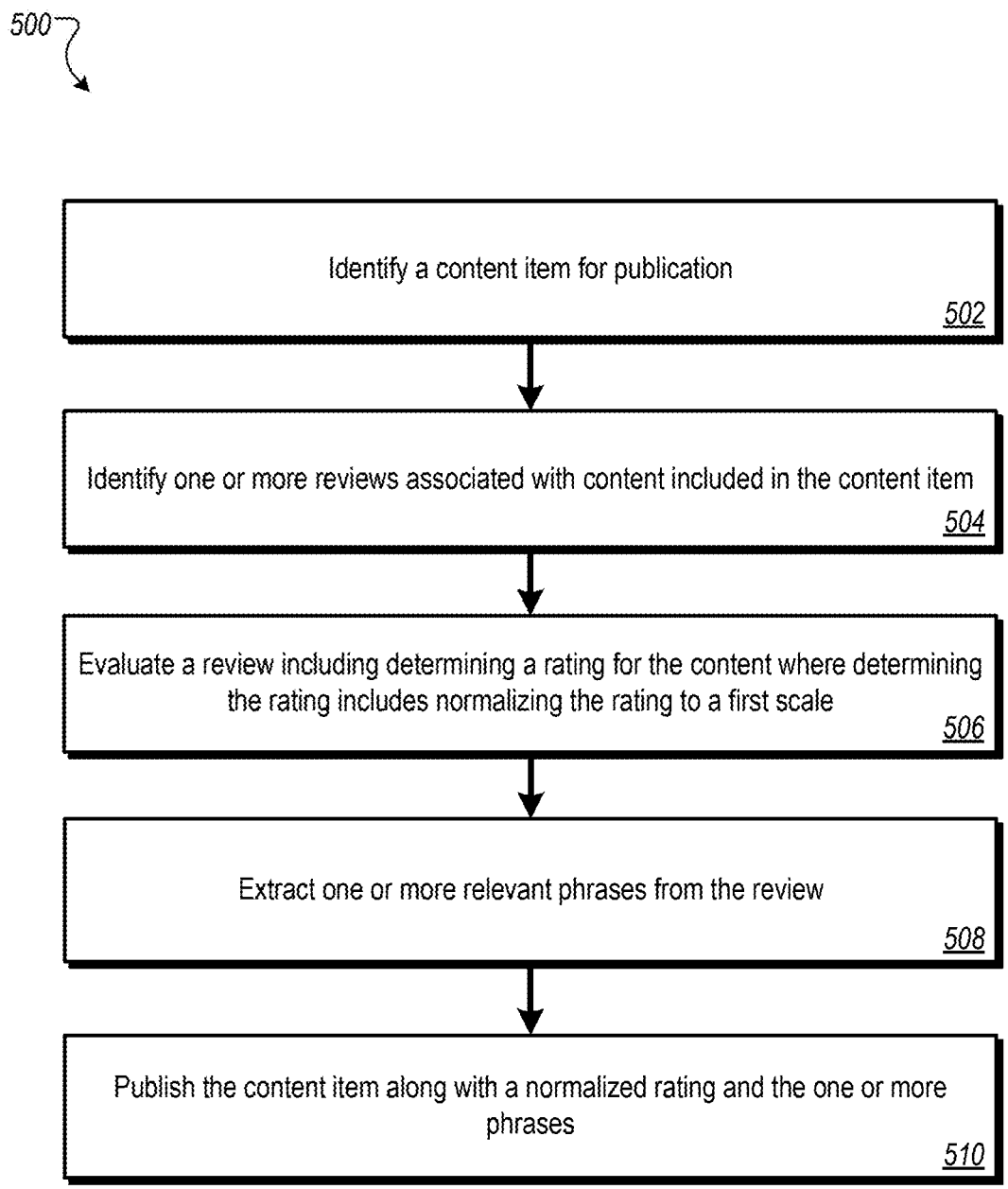
FIG. 5A is a flowchart of an example process for publishing content items with normalized ratings from third-party reviews.

FIG. 5A is a flowchart of an example process 500 for publishing content items with normalized ratings from third-party reviews. In some implementations, components of the content management system 110 can perform the process 500 using instructions that are executed by one or more processors of each. For example, process 500 steps can be performed by the review identification engine 121, the review evaluation engine 122, the phrase extraction engine 123, and the publication engine 124. FIGS. 1-3 are used to provide examples for steps of the process 500.

A content item is identified for publication (502). For example, the content management system 110 can identify the content item 302 (e.g., an advertisement for Brand-X basketball shoes). In some implementations, the identification can occur in advance of a request to publish the content item 302. For example, the identification can occur as part of a background process that prepares content items, including the content item 302 and content items 125 in general, for publication by determining third-party review information that can be included when the content items are ultimately published.

One or more reviews associated with content included in the content item are identified (504). As an example, the review identification engine 121 can access reviews 126 for content associated with the content item 302. The reviews can include, for example, user reviews of Brand-X basketball shoes in general and/or reviews of the specific Rothman style that is the subject of the content item 302.

A review is evaluated, including determining a rating for the content and normalizing the rating to a first scale (506). For example, the review evaluation engine 122 can process reviews 126 associated with Brand-X basketball shoes and determine normalized ratings from the individual ratings. In some implementations, the normalized rating can be a 5-star rating system that is used to normalize ratings that use different scales or systems (e.g., numeric scales, letter grades, etc.). In some implementations, the review evaluation engine 122 can search on keywords in the reviews 126 to find descriptive-rating text in reviews (e.g., where no explicit rating is given) and determine a normalized rating from the text. For example, the review evaluation engine 122 can associate five stars with a review that states "best basketball shoes I ever owned!"

One or more relevant phrases are extracted from the review (508). As an example, the phrase extraction engine 123 can extract textual testimonials and quotes from the reviews 126. As such "Greatest shoes I've ever worn" may be extracted from the review of one user, and "The best player's shoe this year" may be extracted from the review of a different user. In some implementations, the phrase extraction engine 123 can search on keywords in the reviews 126 to identify phrases to extract.

The content item is published along with a normalized rating and the one or more phrases (510). For example, the publication engine 124 can publish the content item 302, including the review information used for the overlay of third-party review information 303. In some implementations, publishing the content item can include storing the content item, e.g., in the content items 125. In some implementations, the publication engine 124 can publish the content item 302 when it is presented to a user, e.g., by providing the advertisement for Brand-X shoes to fill an ad slot on the user's user device 106. In some implementations, publishing the content item can include determining, at a time the content item is served, current reviews, evaluating the current reviews, extracting the phrases from the current reviews, and publishing the content item with the extracted review information. For example, part or all of the review information needed to create an annotated content item can be determined in real time, e.g., in response to a request for content from a user.

Figure 5B:
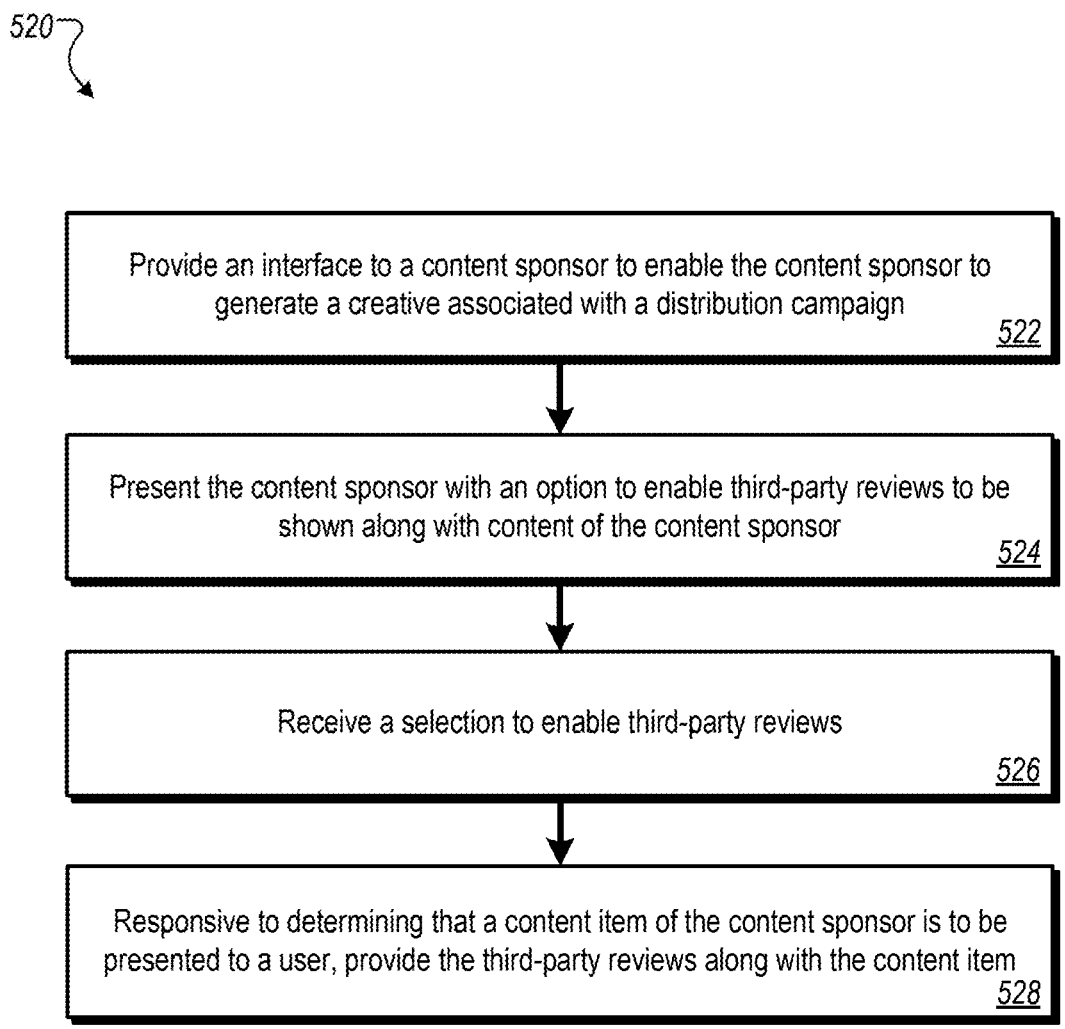
FIG. 5B is a flowchart of an example process for receiving content sponsor inputs to provide third-party review information with a content item.

FIG. 5B is a flowchart of an example process 520 for receiving content sponsor inputs to provide third-party review information with a content item. In some implementations, the sponsor interface 120 can perform the process 520 using instructions that are executed by one or more processors. FIGS. 1, 3 and 4 are used to provide examples for steps of the process 520.

An interface is provided to a content sponsor to enable the content sponsor to generate/manage a creative associated with a distribution campaign (522). For example, the content sponsor can use the sponsor campaign interface 402 to define an advertisement campaign, including advertisement creatives for advertisements to be provided within the environment 100. Other interfaces can be used.

The content sponsor is presented with an option to enable third-party reviews to be shown along with content of the content sponsor (524). For example, the sponsor campaign interface 402 can include a control 406, e.g., a checkbox labeled "Enable third-party review overlays on ads."

A selection is received to enable third-party reviews (526). For example, the campaign sponsor can select the control 406 to indicate that content items in the campaign are to be provided with overlays of third-party review information (e.g., when such information is available for the product or service associated with the content item). Further, the campaign sponsor can select checkboxes 410*a*-410*b* to specify different types of third-party review information to include.

Responsive to determining that a content item of the content sponsor is to be presented to a user, the third-party reviews are provided along with the content item (528). For example, in response to a request for content on the user interface 300, the content item 302 (e.g., the ad for Brand-X basketball shoes) can be provided. In the current example, based on the campaign sponsor's selection of the control 406, the overlay of third-party review information 303 is included when the content item 302 is presented.

Figure 6:
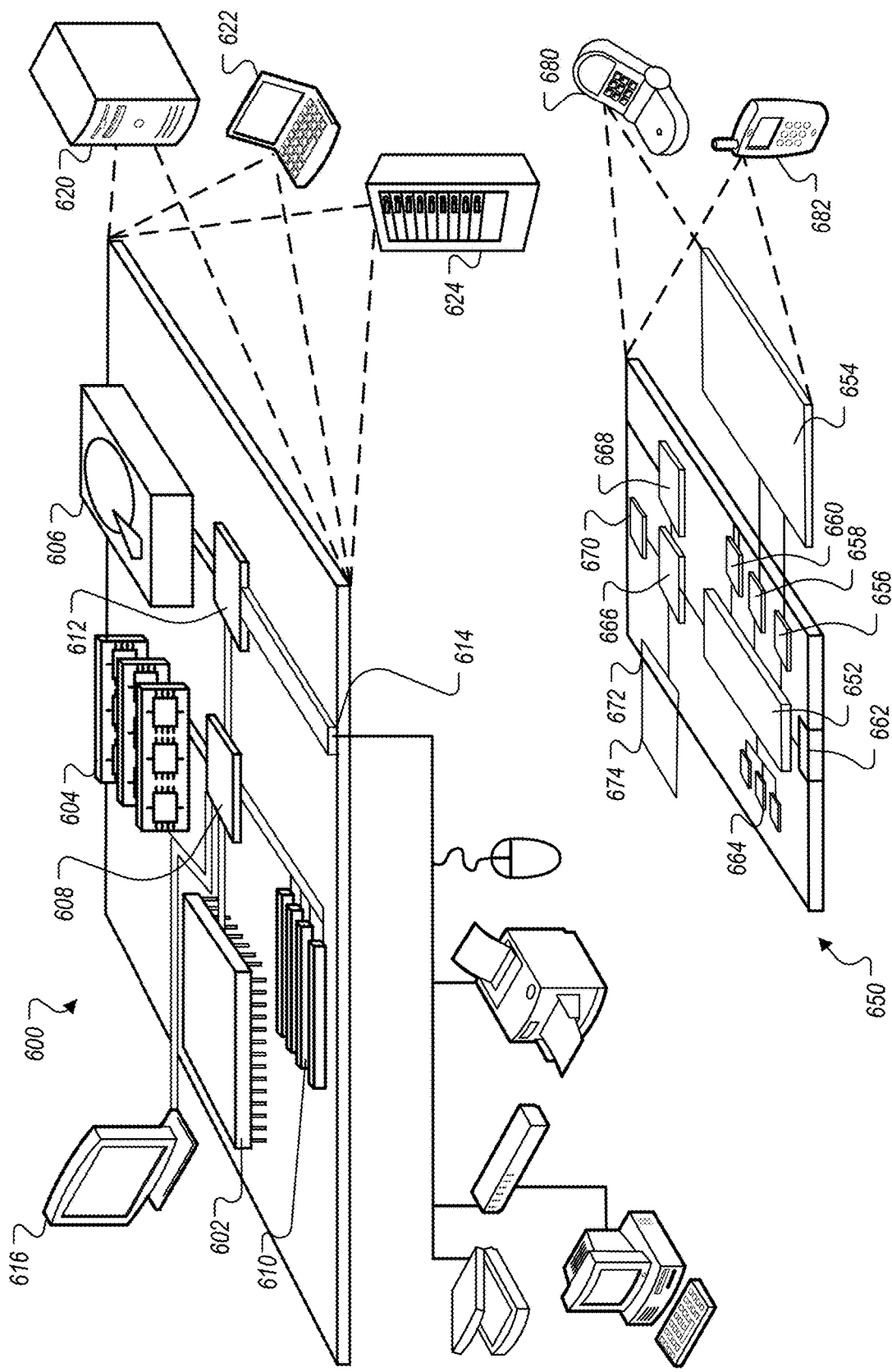
FIG. 6 is a block diagram of an example computer system that can be used to implement the methods, systems and processes described in this disclosure.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent any other typically non-mobile devices, such as televisions or other electronic devices with one or more processers embedded therein or attached thereto. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a subscriber identification module (SIM) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of dynamically providing content items with review information, the method comprising:
   identifying, by a data processing system including one or more processors, responsive to receiving a request for content from a client device, a content item for publication on an information resource, the content item identifying a product or service;
   determining, by the data processing system, that a configuration setting corresponding to the content item is selected by a content provider of the content item to enable display of review information of the product or service with the content item responsive to requests for content from client devices;
   identifying, responsive to determining the configuration setting corresponding to the content item, review information including one or more reviews associated with the product or service identified in the content item;
   determining, by the data processing system, responsive to determining that the configuration setting corresponding to the content item is selected, one or more online ratings corresponding to the product or service from one or more online rating sources;

extracting, by the data processing system, one or more relevant phrases from the one or more reviews;

associating, by the data processing system, responsive to the request for content, the extracted one or more relevant phrases and the one or more online ratings to the content item to display the extracted one or more relevant phrases and the one or more online ratings with the content item on the information resource; and causing, by the data processing system and responsive to the request for content, the client device to display the content item with the extracted one or more relevant phrases and the one or more online ratings by providing, to the client device, the content item with the extracted one or more relevant phrases and the one or more online ratings.

2. The method of claim 1, comprising:
identifying the one or more reviews from reviews available at a time the content item is served and associated with the product or service identified in the content item.

3. The method of claim 1 where the content item is an advertisement.

4. The method of claim 3, wherein the request is a request for an advertisement.

5. The method of claim 1 wherein identifying the one or more reviews includes locating online reviews associated with the product or service identified in the content.

6. The method of claim 1 wherein identifying the one or more reviews includes identifying reviewers that are acceptable to the content provider of the content item.

7. The method of claim 1 wherein determining one or more online ratings includes parsing content associated with the review information to locate ratings of the product or service.

8. The method of claim 1 wherein determining one or more online ratings includes parsing content associated with the one or more reviews to locate one or more rating keywords.

9. The method of claim 8 wherein parsing includes counting occurrences of the rating keywords in the content and summing the total occurrences to generate a normalized rating.

10. The method of claim 8 wherein parsing includes determining and counting occurrences of negative keywords and positive keywords, and wherein generating a normalized rating includes using the determined and counted occurrences of negative keywords and positive keywords.

11. The method of claim 9 where parsing includes weighting ones of the occurrences of rating keywords based on a location in the content.

12. The method of claim 11 where the weighting is greater for occurrences in a first or last paragraph of the content.

13. The method of claim 11 where the weighting is greater for occurrences in a title of the content.

14. The method of claim 8 where the one or more rating keywords signify positive, negative or neutral ratings of the product or service.

15. The method of claim 1, comprising generating a normalized rating by normalizing a plurality of individual online ratings, and providing the normalized rating for display with the content item on the information resource.

16. The method of claim 1, wherein an online rating of the one or more online ratings includes a predetermined number of levels.

17. The method of claim 1, wherein an online rating of the one or more online ratings includes a predetermined number of stars.

18. The method of claim 1 wherein an online rating of the one or more online ratings includes rating attributes and values for one or more attributes that can be used to evaluate the product or service.

19. The method of claim 18 wherein a number and type of attributes are based on the product or service.

20. The method of claim 18 wherein a number and type of attributes are based on information associated with the client device.

21. The method of claim 1, wherein the one or more relevant phrases include a plurality of phrases from a plurality of reviews and the method further comprising providing a control for enabling the client device to navigate to different reviews.

22. The method of claim 1, wherein the one or more phrases are from a single review.

23. The method of claim 21, wherein the content item is configured to cause the client device to display one or more phrases from a first review and upon receipt of a selection of the control by the client device, cause the client device to display one or more other phrases from a second review different from the first review.

24. A content management system for dynamically providing content items with review information, the content management system comprising:
one or more processors; and
a memory storing computer-executable instructions, the computer-executable instructions when executed by the one or more processors, cause the one or more processors to:
identify, in response to receiving a request for content from a client device, a content item of a content sponsor for publication on an information resource, the content item identifying a product or service;
determine that a configuration setting is selected by the content sponsor in relation to the content item to enable display of review information of the product or service with the content item responsive to requests for content from client devices;
identify, responsive to determining that the configuration setting is selected in relation to the content item, review information including one or more reviews associated with the product or service identified in the content item;
determine, responsive to identifying that the configuration setting is selected in relation to the content item, one or more online ratings corresponding to the product or service from one or more online rating sources;
extract one or more relevant phrases from the one or more reviews;
associate, responsive to the request for content, the extracted one or more relevant phrases and the one or more online ratings to the content item to display the extracted one or more relevant phrases and a normalized one or more online ratings with the content item on the information resource; and
cause the client device to display, responsive to the request for content, the content item with the extracted one or more relevant phrases and the one or more online ratings by providing, to the client device, the content item with the extracted one or more relevant phrases and the one or more online ratings.

25. A computer program product tangibly embodied in a computer-readable storage device and comprising instructions that, when executed by a processor, cause the processor to:
- identify responsive to receiving a request for content from a client device, a content item for publication on an information resource, the content item identifying a product or service;
- determine that a configuration setting corresponding to the content item is selected by a content provider of the content item to enable display of review information of the product or service with the content item responsive to requests for content from client devices;
- identify, responsive to determining that the configuration setting corresponding to the content item is selected, review information including one or more reviews associated with the product or service identified in the content item;
- determine, responsive to identifying the configuration setting corresponding to the content item, one or more online ratings corresponding to the product or service from one or more online rating sources;
- extract one or more relevant phrases from the one or more reviews;
- associate, responsive to the request for content, the extracted one or more relevant phrases and the one or more online ratings to the content item to display the extracted one or more relevant phrases and the one or more online ratings with the content item on the information resource; and
- cause the client device to display, responsive to the request for content, the content item with the one or more online ratings and the extracted one or more relevant phrases by providing, to the client device, the content item with the one or more online ratings and the extracted one or more relevant phrases.

26. The method of claim 1 wherein providing the content item with the extracted one or more relevant phrases and the one or more online ratings includes providing the extracted one or more relevant phrases and the one or more online ratings for display in an overlay.

27. The method of claim 1, further comprising:
- providing, to the content provider, an interface including a selectable option to enable third-party reviews to be shown along with content of the content provider;
- receiving a selection to enable the third-party reviews to be shown along with content of the content provider; and
- setting the configuration setting responsive to receipt of the selection to enable the third-party reviews to be shown along with content of the content provider.

28. The method of claim 27, further comprising:
- providing, to the content provider via the interface, selectable online rating sources;
- receiving a selection of an online rating source; and
- receiving the review information including the one or more reviews and the one or more online ratings from the online rating source.

29. The content management system of claim 24, wherein the computer-executable instructions when executed by the one or more processors, further cause the one or more processors to:
- provide, to the content provider, an interface including a selectable option to enable third-party reviews to be shown along with content of the content sponsor;
- receive a selection to enable the third-party reviews to be shown along with content of the content sponsor; and
- set the configuration setting responsive to receipt of the selection to enable the third-party reviews to be shown along with content of the content sponsor.

30. The content management system of claim 29, wherein the computer-executable instructions when executed by the one or more processors, cause the one or more processors to:
- provide, to the content sponsor via the interface, selectable online rating sources;
- receive a selection of an online rating source; and
- receive the review information including the one or more reviews and the one or more online ratings from the online rating source.

\* \* \* \* \*